United States Patent Office 2,722,539
Patented Nov. 1, 1955

2,722,539
DERIVATIVES OF ETHYLENE PYROPHOSPHITE

George W. Anderson, Darien, Conn., assignor to American Cyanamid Company, New York, N. Y., a corporation of Maine No Drawing. Application March 26, 1954,
Serial No. 419,097

3 Claims. (Cl. 260—461)

This invention relates to new chemical compounds and methods for their preparation. More particularly this invention relates to ethylene and diethyl derivatives of ethylene pyrophosphite and methods for their preparation.

The following general formula represents the compounds of the present invention:

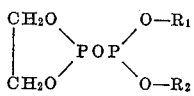

wherein $R_1$ and $R_2$ are members selected from the group consisting of ethyl radicals, and, when taken together, comprise the ethylene radical.

The compounds of the present invention are useful in the synthesis of amides. In my copending U. S. application S. N. 236,080, filed July 10, 1951, now Patent No. 2,691,010, I describe a method for synthesizing amides which comprises reacting a tetraalkylpyrophosphite, a carboxylic acid and an amine having amine hydrogen. This method is especially applicable to the preparation of amides and peptides from the naturally occurring amino acids such as alanine, phenylalanine, valine, norvaline, leucine, norleucine and others. In a similar manner the diethylene pyrophosphite and diethyl ethylene pyrophosphite of this invention are also capable of taking part in the same general reaction to produce amides and peptides.

The reaction for preparing the compounds of the present invention may be illustrated by the following equation:

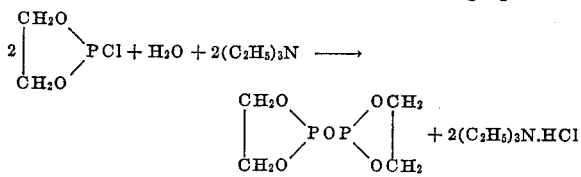

The mechanism of the reaction may be postulated as involving the intermediate formation of ethylene hydrogen phosphite from ethylene chlorophosphite and water followed by reaction of this intermediate with an additional molecule of ethylene chlorophosphite. Although triethylamine is preferred as the base to neutralize the hydrochloric acid formed during the course of the above reaction, any readily available tertiary amine can be used for this purpose, such as for example dimethylaniline.

Where it is desired to obtain the mixed pyrophosphite, namely, diethyl ethylenepyrophosphite, no water is necessary for the reaction since one molecule of diethyl phosphite is supplied according to the following equation:

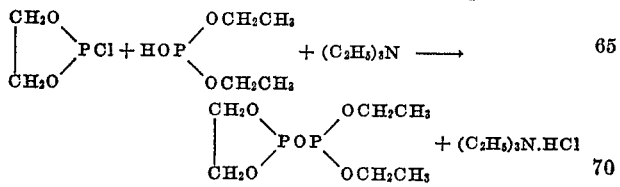

The reactions of the present invention proceed smoothly at temperatures varying between —10° and 50° C., the range of —5° C. to 35° C. being preferred.

Any inert organic solvent is suitable for this reaction. Although benzene is preferred for this purpose, toluene may also be used, as well as various ethers such as dimethylethyl, methylethyl and others.

After completion of the reaction, the resultant mixture should be filtered to remove the triethyl ammonium chloride and then distilled under reduced pressure. Diethylene pyrophosphite is obtained as a fraction boiling at 104 to 105° C. at 5 mm., $n_D^{28}$ 1.4860. In a similar fashion diethylethylene pyrophosphite is obtained as a fraction boiling at 95° to 97° C. at 5 mm., $n_D^{26}$ 1.4529.

The followed examples are intended to serve as illustrations of my invention. All parts are by weight unless otherwise indicated.

Example 1.—Preparation of diethylene pyrophosphite

A solution of 25.3 g. of ethylene chlorophosphite in 40 cc. of benzene was chilled to —5° C. Then a mixture of 20.2 g. of triethylamine and 1.1 g. of water in 40 cc. of benzene was quickly added, causing a temperature rise to 35° C. and solid formation. After 15 minutes of stirring and chilling, the mixture was filtered. Diethylene pyrophosphite was isolated from the filtrate by distillation; B. P. 104–105° C. at 5 mm., $n_D^{28}$ 1.4860.

Example 2.—Preparation of diethyl ethylene pyrophosphite

A chilled solution of 63.5 g. of ethylene chlorophosphite in 100 cc. of dry benzene was added to a chilled solution of 69 g. of diethyl phosphite in 100 cc. of benzene with stirring during 12 minutes. The temperature ranged from 0° to 10° during this time. The product was further stirred with chilling for 15 minutes, then filtered to remove triethylamine hydrochloride. Distillation of the filtrate yielded the diethyl ethylenepyrophosphite as a fraction having B. P. 95–97° at 5 mm., and $n_D^{26}$ 1.4529.

Example 3.—Use of diethylene pyrophosphite to make an amide

To 1.94 g. of ethyl DL-phenylalaninate and 2.09 g. of carbobenzoxyglycine in 7 cc. of diethylphosphite was added 2.17 g. of diethylene pyrophosphite. The solution was heated on a steam bath for 30 minutes, then diluted with 25 cc. of water and chilled, giving an oil which crystallized. This crude carbobenzoxyglycyl-DL-phenylalanine ethyl ester was purified by washing with a 5% solution of sodium bicarbonate, then water. The yield of the dried product was 88%, and the M. P. 90–91°.

I claim:

1. Compounds having the general formula:

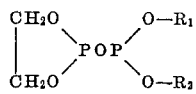

wherein $R_1$ and $R_2$ are members selected from the group consisting of ethyl radicals, and when taken together, comprise the ethylene radical.

2. The compound diethylene pyrophosphite.

3. The compound diethyl ethylene pyrophosphite.

References Cited in the file of this patent

UNITED STATES PATENTS 2,660,603    Young et al. _____ Nov. 24, 1953